UNITED STATES PATENT OFFICE.

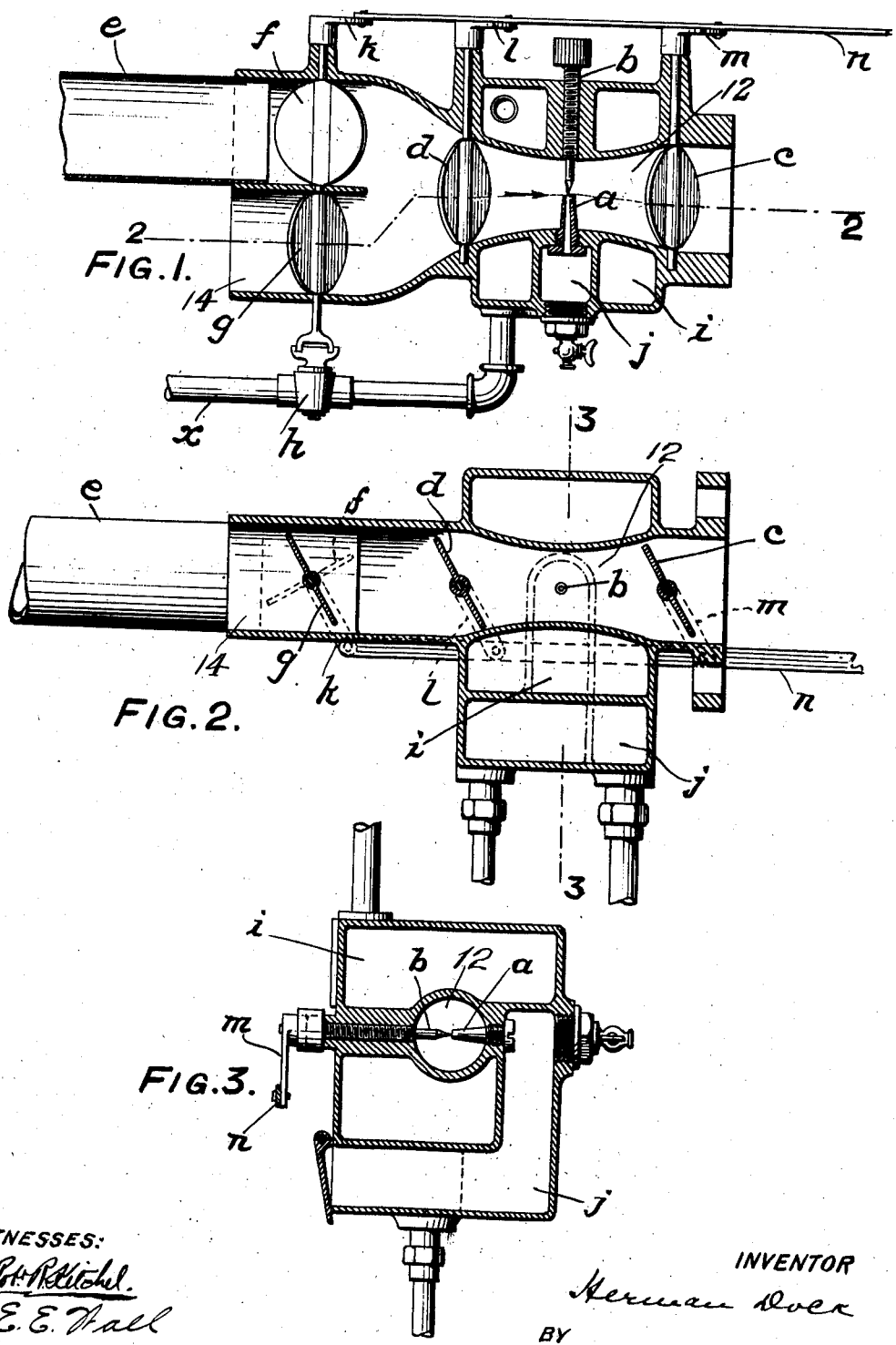

HERMAN DOCK, OF WESTERLY, RHODE ISLAND.

CARBURETER.

1,043,077.  Specification of Letters Patent.  Patented Nov. 5, 1912.

Application filed September 16, 1911. Serial No. 649,648.

*To all whom it may concern:*

Be it known that I, HERMAN DOCK, a citizen of the United States, residing at Westerly, county of Washington, and State of Rhode Island, have invented a new and useful Improvement in Carbureters, of which the following is a full, clear, and exact description, reference being had to the accompanying drawings, which form a part of this specification.

My invention has for its object certain improvements in carbureters for gas engines, for instance, for use in automobiles.

The purpose of my invention is to make the action of the carbureter more certain and better under varying conditions of speed.

I will first describe the embodiment of my invention, shown in the accompanying drawings and then point out the invention in the claims.

In the drawings:—Figure 1 is a sectional elevation of my improved carbureter and connections. Fig. 2 is a cross section on line 2—2, Fig. 1. Fig. 3 is a cross section on line 3—3, Fig. 2.

$a$ is the gasolene nozzle of the carbureter, $b$ the needle valve, $c$ and $d$ throttle valves located, respectively, at each end of the carbureting chamber 12. The valve $c$ controls the connection from the carbureting chamber to the engine. The valve $d$ controls the air supply to the carbureting chamber.

$e$ is a hot air supply pipe, $f$ is a valve in said pipe for controlling the passage of hot air in the pipe $e$.

$g$ is a valve in a pipe 14 leading from the atmosphere, $x$ is a pipe from a heating medium leading to jacket $j$ of carbureter, $h$ is a controlling valve in said pipe. Pipe $x$ may lead from a source of hot water, or it may be in connection with the exhaust gases, where said gases are at a high temperature.

$j$ is the gasolene or other hydrocarbon liquid supply, having the regular pipe connection, not shown, with a tank.

$k$ is a lever to which are connected the valves $f$, $g$ and $h$.

$l$ is a lever to which is connected the valve $d$.

$m$ is a lever to which is connected the valve $c$. These levers are interconnected by rod or link $n$ so that on the movement of the rod or link $n$ the levers all move in unison.

The valves are so set and the lever connection is such that the operation is as follows: Taking it that the valve $c$ is wide open and it is desired to slow down, link $n$ is moved in a direction which causes valve $c$ to close, throttling the engine. At the same time, valve $d$ is closed, which cuts down the air supply to the carbureting chamber, thereby producing the proper proportion of air and liquid, instead of, as ordinarily is the case, leaving this to uncontrolled action. At the same time that the valves $c$ and $d$ are closing, the valve $g$ to the atmosphere is also closing, and the valves $f$ and $h$ are opening, which admits warm or hot air to the inlet to the carbureting chamber, which inlet is controlled by the valve $d$, and also a heating medium to the jacket of the carbureter. At slow speeds, it is better to admit warm air to the carbureting chamber, while at higher speeds a cooler (atmospheric) air is better.

By my construction, I disregard all use of puppet valves, automatic valves, and the like, and relying as I do, for the correct mixture under various speeds on the precise mechanical movement, I approximate the proper proportion of air and fuel, no matter what the speed of the engine may be.

Having now fully described my invention, what I claim and desire to protect by Letters Patent is:

1. In a carbureter having a carbureting chamber, the combination of a valve controlling the air inlet to the carbureting chamber, a valve controlling the outlet from said chamber to the engine, a pipe leading from the atmosphere to the inlet end of the carbureting chamber, a controlling valve in said pipe, a pipe leading from a heated air supply to the inlet end of the carbureting chamber, a controlling valve in said pipe, means to operate said valves, said means being interconnected so as to move said valves in unison, the valve controlling the pipe from the heated air supply being oppositely set from the remainder of the valves.

2. In a carbureter having a carbureting chamber, the combination of a valve controlling the air inlet to the carbureting chamber, a valve controlling the outlet from said chamber to the engine, a pipe leading from the atmosphere to the inlet end of the carbureting chamber, a controlling valve in said pipe, a pipe leading from a heated air supply to the inlet end of the carbureting chamber, a controlling valve in said pipe, means to operate said valves, said means being interconnected so as to move said valves in unison, the valve controlling the pipe from the heated air supply being oppositely set from the remainder of the valves, a jacket for the carbureting chamber, a pipe leading from a heating medium to said jacket, a controlling valve in said pipe, said valve being interconnected with the operating means for the other valves, said valve and the valve in the pipe from the heated air supply to the inlet side of the carbureting chamber being set alike.

3. In a carbureter having a carbureting chamber, the combination of a valve controlling the air inlet to the carbureting chamber, a valve controlling the outlet from said chamber to the engine, a pipe leading from the atmosphere to the inlet end of the carbureting chamber, a controlling valve in said pipe, means to supply heated air between the first named valve and the last-named valve, a jacket for the carbureting chamber, a pipe leading to said jacket, a controlling valve in said pipe, means to operate said valves, said means being interconnected so as to move said valves in unison, the valve controlling the pipe to the jacket being oppositely set from the other valves.

4. In a carbureter having a carbureting chamber, the combination of an air pipe leading to the inlet end of the carbureting chamber, a valve in said pipe, a second valve controlling the inlet to the carbureting chamber, means for supplying air between said two valves, a third valve controlling the outlet from said chamber to the engine, and means to operate said valves, said means being interconnected so as to move said valves in unison.

5. In a carbureter having a carbureting chamber, the combination, of a pipe leading from a heated air supply to the inlet end of the carbureting chamber, a valve in said pipe, a second valve controlling the inlet to the carbureting chamber, means for supplying air between said two valves, a third valve controlling the outlet from said chamber to the engine, and means to operate said valves, said means being interconnected so as to move said valves in unison, the first valve being oppositely set from the other two valves.

6. In a carbureter having a carbureting chamber, the combination of a valve controlling the air inlet to the carbureting chamber, a second valve controlling the outlet from said chamber to the engine, a jacket for the carbureting chamber, a pipe leading to said jacket, a third valve in the last named pipe, and means to operate said valves in unison, the third valve being oppositely set from the other two valves.

7. In a carbureter having a carbureting chamber, the combination of a valve controlling the outlet from said chamber to the engine, a pipe leading from the atmosphere to the inlet end of the carbureting chamber, a second valve in the last named pipe, a pipe leading from a heated air supply to the inlet end of the carbureting chamber, a third valve on the last named pipe, and means to operate said valves, said means being interconnected so as to move said valves in unison, the third valve being oppositely set from the remainder of the valves.

8. In a carbureter having a carbureting chamber, the combination of a valve controlling the outlet from said chamber to the engine, a jacket for the carbureting chamber, a pipe leading to said jacket, a valve in the last named pipe, and means to operate said valves, said means being interconnected so as to move said valves in unison and said valves being oppositely set.

9. In a carbureter having a carbureting chamber, the combination of a valve controlling the air inlet to the carbureting chamber, a pipe leading from the atmosphere to the air inlet to the carbureting chamber, a second valve on the last named pipe, a pipe leading from a heated air supply to the air inlet to the carbureting chamber, a third valve on the last named pipe, and means to operate said valves, said means being interconnected so as to move said valves in unison, the third valve being oppositely set from the other valves.

10. In a carbureter having a carbureting chamber, the combination, of a valve controlling the air inlet to said chamber, a valve controlling the outlet from said chamber to the engine, interconnected means for operating said valves whereby said valves move in unison, a hydrocarbon liquid supply, an inlet to the carbureting chamber from said liquid supply, a pipe leading from the atmosphere to the air inlet end of the carbureting chamber, a controlling valve in said pipe, said valve being interconnected with the operating means of the first mentioned valves, a pipe leading from a heated air supply to the air inlet end of the carbureting chamber, a controlling valve in said pipe, said valve being oppositely set with respect to the other mentioned valves, and interconnected with the operating means for said other mentioned valves.

11. In a carbureter having a carbureting chamber, the combination, of a valve controlling the air inlet to said chamber, a valve controlling the outlet from said chamber to the engine, interconnected means for operating said valves whereby said valves move in unison, a hydrocarbon liquid supply, an inlet to the carbureting chamber from said liquid supply, a pipe leading from the atmosphere to the air inlet end of the carbureting chamber, a controlling valve in said pipe, said valve being interconnected with the operating means of the first mentioned valves, a pipe leading from a heated air supply to the air inlet end of the carbureting chamber, a controlling valve in said pipe, a jacket for said carbureting chamber, a pipe from a heating medium to said jacket, a controlling valve in said pipe, said two last mentioned valves being oppositely set with respect to the remainder of said valves, and said two valves being interconnected with the operating means for the other valves.

In testimony of which invention, I have hereunto set my hand, at Philadelphia, on this 13th day of September, 1911.

HERMAN DOCK.

Witnesses:
M. M. HAMILTON.
E. E. WALL.